(12) United States Patent
Ma

(10) Patent No.: US 10,025,147 B2
(45) Date of Patent: Jul. 17, 2018

(54) BLUE PHASE LIQUID CRYSTAL DISPLAY DEVICE AND MANUFACTURING METHOD THEREOF

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Juncai Ma, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/744,758

(22) Filed: Jun. 19, 2015

(65) Prior Publication Data

US 2016/0291425 A1   Oct. 6, 2016

(30) Foreign Application Priority Data

Mar. 31, 2015 (CN) .......................... 2015 1 0148186

(51) Int. Cl.
G02F 1/1337    (2006.01)
G02F 1/137     (2006.01)
(Continued)

(52) U.S. Cl.
CPC .. *G02F 1/134363* (2013.01); *G02F 1/133707* (2013.01); *G02F 1/1339* (2013.01); *G02F 1/13394* (2013.01); *G02F 2001/13793* (2013.01)

(58) Field of Classification Search
CPC ..... G02F 1/133707; G02F 2001/13793; G02F 1/1339; G02F 1/13394
See application file for complete search history.

(56) References Cited

U.S. PATENT DOCUMENTS

2007/0188428 A1* 8/2007 Nishiyama ........... G09G 3/2011
                                                    345/87
2009/0115954 A1* 5/2009 Tseng ................. G02F 1/13394
                                                    349/156
(Continued)

FOREIGN PATENT DOCUMENTS

CN     101762913 A     6/2010
CN     102253540 A    11/2011
(Continued)

OTHER PUBLICATIONS

The Third Chinese Office Action dated Dec. 25, 2017; Appln. No. 201510148186.X.

(Continued)

*Primary Examiner* — Jia Pan
(74) *Attorney, Agent, or Firm* — Ladas & Parry LLP

(57) ABSTRACT

A blue phase liquid crystal display device and a manufacturing method thereof are provided. The blue phase liquid crystal display device includes a plurality of pixel units arranged in a matrix, the blue phase liquid crystal display device including: a first substrate and a second substrate arranged opposite to each other, and a blue phase liquid crystal layer arranged between the first substrate and the second substrate. Each of the pixel units includes: first protrusions located on the first substrate; pixel electrodes covering the first protrusions; second protrusions located on the second substrate; and common electrodes covering the second protrusions.

16 Claims, 2 Drawing Sheets

(51) Int. Cl.
*G02F 1/1343* (2006.01)
*G02F 1/1339* (2006.01)

(56) References Cited

U.S. PATENT DOCUMENTS

| | | | | |
|---|---|---|---|---|
| 2009/0219466 | A1* | 9/2009 | Kagawa | G02F 1/134363 349/96 |
| 2010/0165280 | A1 | 7/2010 | Ishitani et al. | |
| 2010/0195028 | A1* | 8/2010 | Kubota | G02F 1/134363 349/106 |
| 2011/0063553 | A1* | 3/2011 | Hanaoka | G02F 1/133753 349/123 |
| 2011/0222016 | A1* | 9/2011 | Kaneko | G02F 1/13394 349/155 |
| 2011/0234927 | A1* | 9/2011 | Ogawa | G02F 1/1339 349/5 |
| 2011/0249229 | A1* | 10/2011 | Kubota | G02F 1/133707 349/141 |
| 2011/0299002 | A1* | 12/2011 | Won | G02B 5/201 349/43 |
| 2012/0113333 | A1* | 5/2012 | Oba | G02F 1/1345 349/5 |
| 2012/0243067 | A1* | 9/2012 | Baumann | B60R 1/088 359/267 |
| 2012/0293738 | A1* | 11/2012 | Zhao | G02F 1/134363 349/43 |
| 2013/0135563 | A1* | 5/2013 | Kubota | G02F 1/134363 349/96 |
| 2013/0335660 | A1* | 12/2013 | Jung | G02F 1/1345 349/42 |
| 2013/0342779 | A1* | 12/2013 | Jung | G02B 6/0083 349/43 |
| 2013/0342795 | A1* | 12/2013 | Park | G02F 1/133512 349/110 |

FOREIGN PATENT DOCUMENTS

| | | |
|---|---|---|
| CN | 102314030 A | 1/2012 |
| CN | 202600306 U | 12/2012 |
| CN | 103018979 A | 4/2013 |

OTHER PUBLICATIONS

The Second Chinese Office Action dated Aug. 28, 2017; Appln. 201510148186.X.

First Chinese Office Action dated Apr. 1, 2017; Appln. No. 201510148186.X.

\* cited by examiner

BLUE PHASE LIQUID CRYSTAL DISPLAY DEVICE AND MANUFACTURING METHOD THEREOF

TECHNICAL FIELD

Embodiments of the invention relate to a blue phase liquid crystal display device and a manufacturing method thereof.

BACKGROUND

Blue phase liquid crystal is a phase state with special properties in liquid crystal. When not applied with voltage, the blue phase liquid crystal has an isotropic refractive index, and light cannot transmit through a display panel and forms a dark field; when applied with voltage, the blue phase liquid crystal has an anisotropic refractive index, birefringence occurs, the light can transmit through the display panel and light transmission is realized. In addition, anisotropy of the refractive index of the blue phase liquid crystal changes with applied voltage, and adjustment on light transmittance can be realized by adjusting voltage. A display device adopting the blue phase liquid crystal can greatly improve a response speed without aligning treatment.

The blue phase liquid crystal display device usually uses a horizontal electric field, which is formed by, for example, structures such as an In-Plane Switching (IPS) type, a Fringe Field Switching (FFS) type and an Advanced Super Dimension Switch (ADS) type.

Since pixel electrodes and common electrodes which are used for forming the horizontal electric field in the blue phase liquid crystal display device are all located on an array substrate, electric field lines formed between the pixel electrodes and the common electrodes need to go through a passivation layer, which plays a weakening effect on electric field intensity. In addition, the pixel electrodes and the common electrodes are tiled on the array substrate, and a blue phase liquid crystal layer also generates a weakening action on the electric field intensity, such that the closer a position to a color filter substrate is, the weaker the electric field intensity is, so a very high voltage is required for normally driving the blue phase liquid crystal display device.

SUMMARY OF THE INVENTION

An embodiment of the invention provides A blue phase liquid crystal display device, comprising a plurality of pixel units arranged in a matrix, the blue phase liquid crystal display device comprising: a first substrate and a second substrate arranged opposite to each other, and a blue phase liquid crystal layer arranged between the first substrate and the second substrate; wherein, each of the pixel units includes: first protrusions located on the first substrate, the first protrusions being located on one side of the first substrate facing the second substrate and protruding toward the second substrate; pixel electrodes covering the first protrusions; second protrusions located on the second substrate, the second protrusions being located on one side of the second substrate facing the first substrate and protruding toward the first substrate; and common electrodes covering the second protrusions, wherein, as viewed in a plane view parallel with the first substrate or the second substrate, the first protrusions and the second protrusions are of strip shape extending along a first direction, and the first protrusions and the second protrusions are arranged alternately at intervals in a second direction perpendicular to the first direction.

Another embodiment of the invention provides a manufacturing method of a blue phase liquid crystal display device, the blue phase liquid crystal display device manufactured comprising a plurality of pixel units arranged in a matrix, the manufacturing method comprising: forming first protrusions in a region corresponding to each of the pixel units on a first substrate; forming pixel electrodes covering the first protrusions; forming second protrusions in a region corresponding to each of the pixel units on a second substrate; forming common electrodes covering the second protrusions; and forming a blue phase liquid crystal layer between the first substrate and the second substrate, and a side of the first substrate on which the first protrusions are formed facing a side of the second substrate on which the second protrusions are formed, wherein, as viewed in a plane view parallel with the first substrate or the second substrate, the first protrusions and the second protrusions are of strip shape extending along a first direction, and the first protrusions and the second protrusions are arranged alternately at intervals in a second direction perpendicular to the first direction.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

First Embodiment

Figure 1:
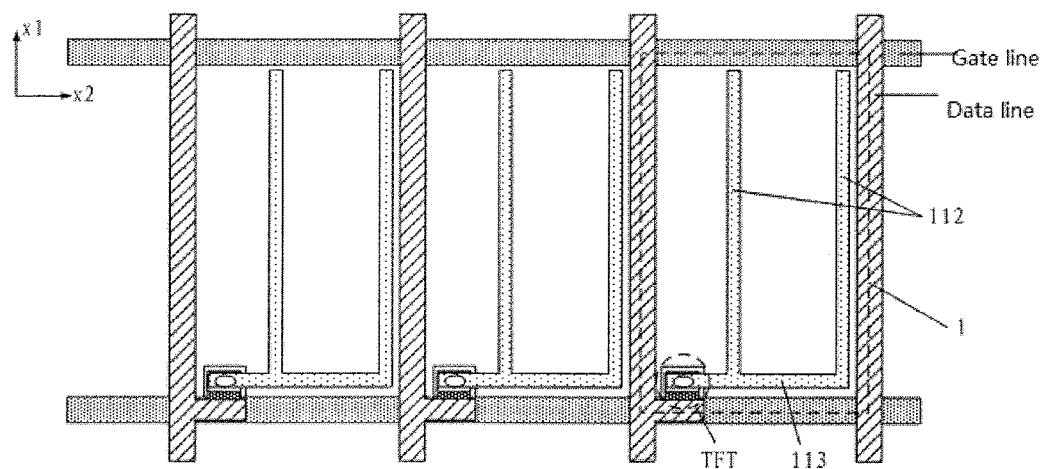
FIG. 1 is a plane diagram of a first substrate of a blue phase liquid crystal display device provided by an embodiment of the invention.
Figure 2:
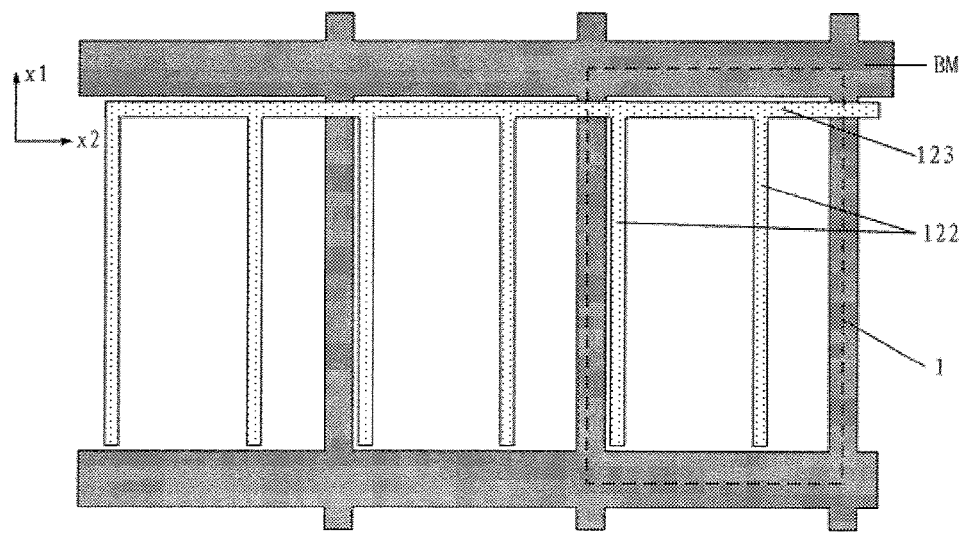
FIG. 2 is a plane diagram of a second substrate of the blue phase liquid crystal display device provided by an embodiment of the invention.
Figure 3:
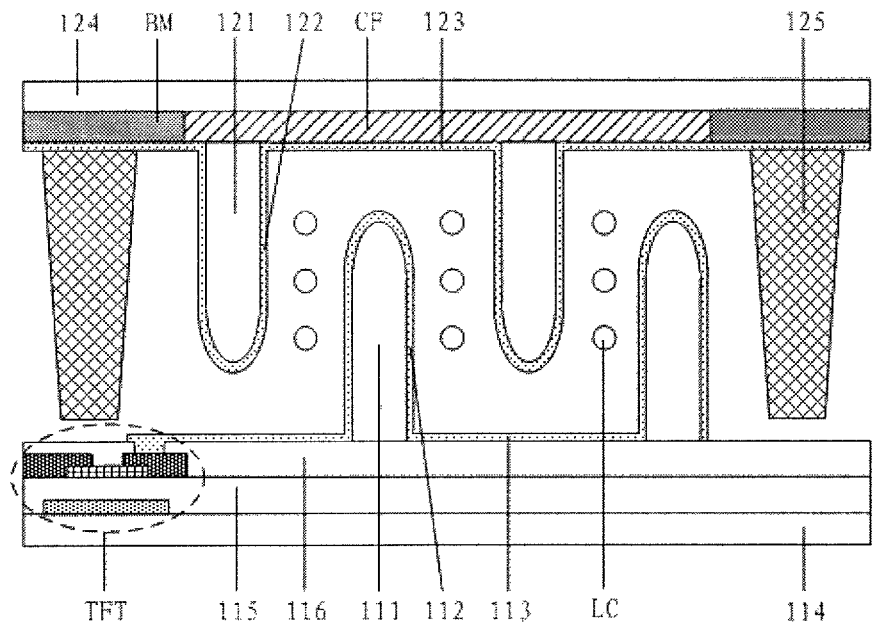
FIG. 3 is a cross-sectional diagram of the blue phase liquid crystal display device provided by an embodiment of the invention along a second direction and perpendicular to the first substrate.

The embodiment provides a blue phase liquid crystal display device, which comprises a plurality of pixel units arranged in a matrix; as illustrated in FIGS. 1-3, the blue phase liquid crystal display device comprises: a first substrate 114 and a second substrate 124 arranged opposite to each other; and a blue phase liquid crystal layer LC arranged between the first substrate 114 and the second substrate 124;

each pixel unit includes: first protrusions 111 located on the first substrate 114; pixel electrodes 112 covering the first protrusions 111; second protrusions 121 located on the second substrate 124; and common electrodes 122 covering the second protrusions 121. For example, the first protrusions are located on one side of the first substrate facing the second substrate and protrude toward the second substrate; the second protrusions are located on one side of the second substrate facing the first substrate and protrude toward the first substrate.

The first protrusions 111 extend along a first direction x1, the second protrusions 121 extend along a direction opposite to the first direction x1, the first protrusions 111 and the second protrusions 121 are arranged alternately in a second direction x2, the first direction x1 and the second direction x2 are perpendicular to each other, and a plane determined by the first direction x1 and the second direction x2 is parallel with the first substrate 114.

In the blue phase liquid crystal display device, the first protrusions 111 extend along the first direction x1, the second protrusions 121 extend along the direction opposite to the first direction x1, and the first protrusions 111 and the second protrusions 121 are arranged alternately in the second direction x2, so the pixel electrodes 112 covering the first protrusions 111 and the common electrodes 122 covering the second protrusions 121 are arranged alternately, and on both sides of a pixel electrode 112, there are common electrodes 122 opposite thereto, so a horizontal electric field is formed between the pixel electrode 112 and the common electrodes 122.

In the prior art, pixel electrodes and common electrodes which are used for forming the horizontal electric field are arranged on an array substrate, so either the pixel electrodes or the common electrodes are located below a passivation layer, such that electric field lines need to penetrate through the passivation layer, which generates a weakening action on electric field intensity. In the blue phase liquid crystal display device provided by the embodiment, the pixel electrodes 112 are located on the first substrate 114, the common electrodes 122 are located on the second substrate 124, so the electric field lines do no need to go through the passivation layer, thereby preventing the passivation layer from weakening the electric field intensity.

In the prior art, the pixel electrodes and the common electrodes which are used for forming the horizontal electric field are structures tiled on the array substrate; in a direction perpendicular to the array substrate, the operation of driving the blue phase liquid crystal at a position farther away from the array substrate (for example, a position close to a color filter substrate) requires that the electric field lines go through a thicker blue phase liquid crystal layer, such that the blue phase liquid crystal layer generates a stronger weakening action on the electric field intensity. In the blue phase liquid crystal display device provided by the embodiment, since the pixel electrodes 112 cover the first protrusions 111 and the common electrodes 122 cover the second protrusions 121, the pixel electrodes 112 and the common electrodes 122 can go deep into the blue phase liquid crystal layer LC to form a horizontal electric field, and the electric field lines do not need to go through the thicker blue phase liquid crystal layer in the direction perpendicular to the first substrate 114, thereby preventing the blue phase liquid crystal layer from weakening the electric field intensity.

To sum up, since the blue phase liquid crystal display device provided by the embodiment can prevent the passivation layer and the blue phase liquid crystal layer from weakening the electric field intensity, under the condition of the same electric field intensity required for normally driving the blue phase liquid crystal display device, the blue phase liquid crystal display device in the embodiment requires a lower driving voltage compared with that in the prior art, namely, the driving voltage of the blue phase liquid crystal display device is reduced by the technical solution provided by the embodiment.

In addition, since the pixel electrodes and the common electrodes in the prior art are structures tiled on the array substrate, the electric field intensity of a horizontal electric field formed from one side of the array substrate to one side of a color filter substrate in the direction perpendicular to the array substrate becomes weak gradually, uniformity of the electric field intensity is poorer, and the electric field at a position close to the color filter substrate is no longer a standard horizontal electric field, which causes an adverse effect on deflection of blue phase liquid crystal and a lowered display quality. In the blue phase liquid crystal display device provided by the embodiment, since the pixel electrodes 112 cover the first protrusions 111 and the common electrodes 122 cover the second protrusions 121, the pixel electrodes 112 and the common electrodes 122 can go deep into the blue phase liquid crystal layer LC to form a horizontal electric field, compared with the prior art, in the direction perpendicular to the first substrate 114, horizontal electric fields formed at respective positions comply with a standard, the uniformity of the electric field intensity is improved and the display quality is improved.

In one example, the first direction x1 can be a transverse direction (an extending direction of gate lines) and the second direction x2 can be a longitudinal direction (an extending direction of data lines).

In the embodiment, each pixel unit 1 may further includes: a pixel voltage signal input line 113 located on the first substrate 114, the pixel voltage signal input line 113 being electrically connected with the pixel electrodes 112; and a common voltage signal input line 123 located on the second substrate 124, the common voltage signal input line 123 being electrically connected with the common electrodes 122. The pixel voltage signal input line 113 and the common voltage signal input line 123 extend along the second direction x2. In each pixel unit 1, respective pixel electrodes 112 are electrically connected with the pixel voltage signal input line 113 respectively, so pixel voltage signals are applied to the respective pixel electrodes 112, and respective common electrodes 122 are electrically connected with the common voltage signal input line 123 respectively, so common voltage signals are applied to the respective common electrodes 122.

Opposite directions toward which the first protrusions and the second protrusions extend are directions extending from the pixel voltage signal input line 113 and the common voltage signal input line 123, respectively. However, in combination with plane diagrams of FIG. 1 and FIG. 2, the first protrusions and the second protrusions are strip-shaped extending along the first direction. The first protrusions and the second protrusions are arranged alternately at intervals in the second direction perpendicular to the first direction.

Based on the foregoing solution, the first substrate 114 of the blue phase liquid crystal display device provided by the embodiment of the invention further includes: a plurality of Gate lines along the second direction x2 and a plurality of Data lines along the first direction x1, the Gate lines and the Data lines are crossed with each other and define a plurality of pixel unit regions, thin film transistors TFTs are arranged at intersections of the Gate lines and the Data lines, gate electrodes of the TFTs are electrically connected with the Gate lines, and source electrodes of the TFTs are electrically connected with the Data lines. After being electrically connected with the respective pixel electrodes 112, the pixel voltage signal input line 113 may be electrically connected to drain electrodes of the TFTs, so the TFTs can be used to control whether pixel voltage signals are input to the pixel electrodes 112.

Generally, common voltage signals applied to respective common electrodes 122 are the same, so common voltage signal input lines 123 in respective pixel units 1 of the same line are electrically connected in sequence to form a whole common voltage signal input line 123, so as to uniformly apply the common voltage signals to the common electrodes 122 in respective pixel units 1 of the same line, thereby saving wires and material, and simplifying the structure of the second substrate 124.

In order to obtain pixel voltage signals and common voltage signals from a driving circuit outside a liquid crystal cell assembled by the first substrate 114 and the second substrate 124, each pixel unit of the blue phase liquid crystal display device provided by the embodiment of the invention may further include: a pixel voltage signal periphery line (not illustrated) electrically connected with the pixel voltage signal input line 113, for transmitting an external pixel voltage signal to the pixel voltage signal input line 113; and a common voltage signal periphery line (not illustrated) electrically connected with the common voltage signal input line 123, for transmitting an external common voltage signal to the common voltage signal input line 123.

Based on the foregoing solution, the mode of providing the pixel voltage signals and the common voltage signals can be further selected according to actual situation.

In some examples, the pixel voltage signal periphery line and the common voltage signal periphery line can be arranged on a frame region of the first substrate 114, and are then electrically connected with an external driving circuit, so the pixel voltage signals and the common voltage signals can be supplied only from the side of the first substrate 114, such that binding regions where the pixel voltage signal periphery line and the common voltage signal periphery line are respectively electrically connected with the external driving circuit are concentrated on the same substrate, saving a binding procedure.

In other examples, the pixel voltage signal periphery line can be arranged on the frame region of the first substrate 114, the common voltage signal periphery line can be arranged on a frame region of the second substrate 124, then the pixel voltage signal periphery line and the common voltage signal periphery line are electrically connected with the external driving circuit respectively, realizing that the pixel voltage signals are supplied from the side of the first substrate 114 and the common voltage signals are supplied from the side of the second substrate 124, and the common voltage signal periphery line is moved from the first substrate 114 to the second substrate 124, which reduces a wiring area on the first substrate 114, facilitates narrowing a frame of the blue phase liquid crystal display device, and is conducive to reducing crosstalk between the pixel voltage signal periphery line and the common voltage signal periphery line.

In other examples, the pixel voltage signal periphery line and the common voltage signal periphery line can be arranged on the frame region of the second substrate 124, and are then electrically connected with the external driving circuit, so the pixel voltage signals and the common voltage signals can be only supplied from the side of the second substrate 124, such that binding regions where the pixel voltage signal periphery line and the common voltage signal periphery line are respectively electrically connected with the external driving circuit are concentrated on the same substrate, saving a binding procedure, and greatly reducing a wiring area on the first substrate 114.

It should be noted that when the pixel voltage signal periphery line and the common voltage signal periphery line are both located on the first substrate 114, the common voltage signal input line 123 is located on the second substrate 124, so the common voltage signal periphery line and the common voltage signal input line 123 are located on different substrates, and a conductive golden ball can be arranged between the first substrate 114 and the second substrate 124, with one end of the conductive golden ball electrically connected with the common voltage signal periphery line on the first substrate 114, and the other end of the conductive golden ball electrically connected with the common voltage signal input line 123 on the second substrate 124, so as to realize an electric connection between the common voltage signal periphery line and the common voltage signal input line 123.

Figure 4:
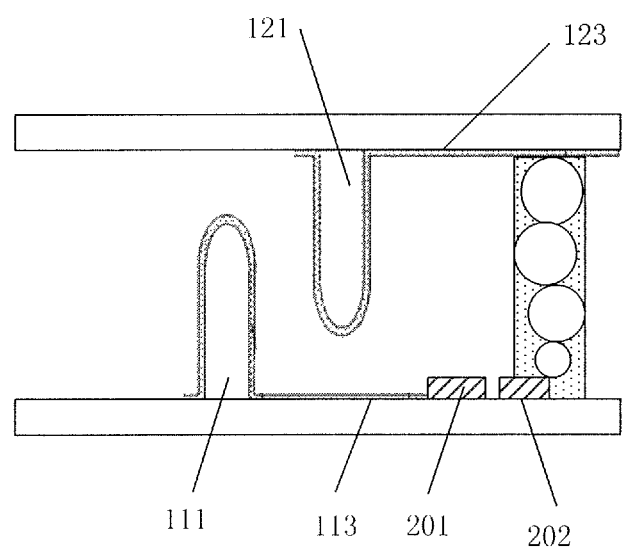
FIG. 4 is a cross-sectional diagram of the blue phase liquid crystal display device provided by some embodiments of the invention along the second direction and perpendicular to the first substrate.

FIG. 4 is a schematic diagram of a display device according to some embodiments of the invention. In a structure as illustrated in FIG. 4, it illustrates that the pixel voltage signal periphery line 201 and the common voltage signal periphery line 202 are arranged on the first substrate 114. The pixel voltage signal periphery line 201 is connected with the pixel voltage signal input line 113. The common voltage signal periphery line 202 is electrically connected with the common voltage signal input line 123 on the second substrate by the golden ball in sealant.

Both FIG. 3 and FIG. 4 schematically illustrate the pixel voltage signal input line 113 and the common voltage signal input line 123. However, such diagrams are only given for convenience, and do not represent that the pixel voltage signal input line 113 and the common voltage signal input line 123 are in the same cross-section. In combination with FIG. 1 and FIG. 2, the pixel voltage signal input line 113 and the common voltage signal input line 123 can be at opposite sides of the first protrusions or the second protrusions in the first direction.

As illustrated by FIG. 3 and FIG. 4, the pixel electrodes are located on top and side surfaces of the first protrusions, and the common electrodes are located on top and side surfaces of the second protrusions. However, the embodiment of the invention is not limited thereto.

When the pixel voltage signal periphery line and the common voltage signal periphery line are located on the second substrate 124, the pixel voltage signal input line 113 is located on the first substrate 114, so the pixel voltage signal periphery line and the pixel voltage signal input line 113 are located on different substrates, and a conductive golden ball can be arranged between the first substrate 114 and the second substrate 124, with one end of the conductive golden ball electrically connected with the pixel voltage signal input line 113 on the first substrate 114, and the other end of the conductive golden ball electrically connected with the pixel voltage signal periphery line on the second substrate 124, so as to realize an electric connection between the pixel voltage signal periphery line and the pixel voltage signal input line 113.

In order to prevent the arranged conductive golden ball from affecting light transmittance of the pixel units, the conductive golden ball can be arranged in sealant between the first substrate 114 and the second substrate 124.

In the embodiment, materials for forming the first protrusions 111 and the second protrusions 121 can both be an organic transparent dielectric material, so light transmittance of the pixel units will not be affected; besides, a film formed by the organic transparent dielectric material is hard, so desired heights of the first protrusions 111 and the second protrusions 121 can be ensured.

In some examples, the height of the first protrusions 111 and the height of the second protrusions 121 can be both less than or equal to a thickness of the blue phase liquid crystal layer LC.

The height of the first protrusions 111 and the height of the second protrusions 121 are equal to the thickness of the blue phase liquid crystal layer LC, the first protrusions 111 and the second protrusions 121 penetrate through the whole blue phase liquid crystal layer LC in a direction perpendicular to the first substrate 114, namely, the pixel electrodes 112 and the common electrodes 122 penetrate through the whole blue phase liquid crystal layer LC in the direction perpendicular to the first substrate 114, so a horizontal electric field exists at respective positions of the blue phase liquid crystal layer LC in the direction perpendicular to the first substrate 114 and electric field intensity is uniform.

Considering that the blue phase liquid crystal display device is squeezed by stress in an actual use process, if the height of the first protrusions 111 and the height of the second protrusions 121 are equal to the thickness of the blue phase liquid crystal layer LC, the first protrusions 111 and the second protrusions 121 will be squeezed too, and may be damaged due to squeeze of the stress, and an adverse effect is generated to the horizontal electric field formed by the pixel electrodes 112 covering the first protrusions 111 and the common electrodes 122 covering the second protrusions 121, which results in a lowered display quality, so the in the embodiment, preferably, the height of the first protrusions 111 and the height of the second protrusions 121 are both less than the thickness of the blue phase liquid crystal layer LC, so as to provide certain space for deformation of the blue phase liquid crystal display device due to stress squeezing, thereby protecting the first protrusions 111 and the second protrusions 121.

Furthermore, a spacer 125 between the first substrate 114 and the second substrate 124 of the blue phase liquid crystal display device generally includes two kinds: a main spacer and an auxiliary spacer (the spacer 125 as illustrated in FIG. 3 is an auxiliary spacer), the height of the main spacer is equal to the thickness of the blue phase liquid crystal layer LC, and mainly plays a supporting role. The height of the main spacer is greater than that of the auxiliary spacer and the auxiliary spacer is used for keeping the thickness of the blue phase liquid crystal layer LC in a certain scope when the blue phase liquid crystal display device is deformed by stress. The height of the first protrusions 111 and the height of the second protrusions 121 can be less than or equal to the height of the auxiliary spacer so as to better protect the first protrusions 111 and the second protrusions 121.

More particularly, a ratio of the height of the first protrusions 111 to the thickness of the blue phase liquid crystal layer LC ranges within 1:2-4:5, and a ratio of the height of the second protrusions 121 to the thickness of the blue phase liquid crystal layer LC ranges within 1:2-4:5, thus not only ensuring that the horizontal electric field formed by the pixel electrodes 112 covering the first protrusions 111 and the common electrodes 122 covering the second protrusions 121 has higher uniformity, but also ensuring that the first protrusions 111 and the second protrusions 121 are not stressed when the blue phase liquid crystal display device is stressed, so as to better protect the first protrusions 111 and the second protrusions 121.

In the embodiment, in each pixel unit 1, intervals between the first protrusions and the second protrusions 121 adjacent to the first protrusions along a plane direction of the substrate are called as preset intervals, and in order to ensure the uniformity of the horizontal electric field at respective positions of the blue phase liquid crystal layer LC in a direction parallel with the first substrate 114, for example, respective preset intervals can be equal.

Amounts of the first protrusions 111 and the second protrusions 121 in each pixel unit 1 can be designed according to the size of the pixel unit 1, in some examples, each pixel unit 1 includes 2-4 first protrusions 111, and 2-4 second protrusions 121, namely, 2-4 pixel electrodes and 2-4 common electrodes.

It should be noted that in the embodiment, the first substrate 114 can be a base substrate of the array substrate, and the second substrate 124 can be a base substrate of the color filter substrate. The first substrate 114 may further include: a gate insulation layer 115 covering a film layer where the gate electrodes of the TFTs and the Gate lines are located; an active layer formed on the gate insulation layer 115; and a passivation layer 116 covering a film layer where the data lines and source electrodes and drain electrodes of the TFTs are located. The second substrate 124 further includes: a black matrix BM, wherein the black matrix BM is of a grid structure, and grid regions defined by the black matrix BM correspond to pixel unit regions defined by the Gate lines and the Data lines on the first substrate 114; and color filters CF in the grid region defined by the black matrix BM.

In addition, the blue phase liquid crystal display device provided by the embodiment can be any product or part with a display function, such as a liquid crystal panel, electronic paper, a mobile phone, a tablet computer, a television, a monitor, a laptop computer, a digital photo frame and a navigator, etc.

Second Embodiment

The embodiment provides a manufacturing method of a blue phase liquid crystal display device, the blue phase liquid crystal display device manufactured comprises a plurality of pixel units arranged in a matrix, as illustrated in FIG. 3, and the manufacturing method comprises steps of: forming first protrusions 111 in a region corresponding to each pixel unit on a first substrate 114; forming pixel electrodes 112 covering the first protrusions 111; forming second protrusions 121 in a region corresponding to each pixel unit on a second substrate 124; forming common electrodes 122 covering the second protrusions 121; and forming a blue phase liquid crystal layer LC between the first substrate 114 and the second substrate 124.

The first protrusions 111 extend along a first direction x1, the second protrusions 121 extend along a direction opposite to the first direction x1, the first protrusions 111 and the second protrusions 121 are arranged alternately in a second direction x2, the first direction x1 and the second direction x2 are perpendicular to each other, and a plane determined by the first direction x1 and the second direction x2 is parallel with the first substrate 114.

The blue phase liquid crystal display device manufactured by the manufacturing method provided by the embodiment can prevent the passivation layer and the blue phase liquid crystal layer from weakening the electric field intensity, so under the condition of the same electric field intensity required for normally driving the blue phase liquid crystal display device, the blue phase liquid crystal display device manufactured by the manufacturing method in the embodiment requires a lower driving voltage compared with that in the prior art, namely, the driving voltage of the blue phase liquid crystal display device is reduced by the manufacturing method provided by the embodiment.

Particularly, a process of forming the first protrusions can be: adopting an organic transparent dielectric material to form a material layer, and exposing and developing the material layer to form a pattern including the first protrusions 111. Similarly, the second protrusions 121 can be formed by adopting a similar process.

The foregoing embodiments merely are exemplary embodiments of the invention, and not intended to define the scope of the invention, and the scope of the invention is determined by the appended claims.

The present application claims priority of Chinese Patent Application No. 201510148186.X filed on Mar. 31, 2015, the disclosure of which is incorporated herein by reference in its entirety as part of the present application.

What is claimed is:

1. A blue phase liquid crystal display device, comprising a first substrate and a second substrate arranged opposite to each other, and a blue phase liquid crystal layer arranged between the first substrate and the second substrate, wherein, the blue phase liquid crystal display device comprises a plurality of pixel units arranged in a matrix, and each of the pixel units includes:
   first protrusions located on the first substrate, the first protrusions being located on one side of the first substrate facing the second substrate and protruding toward the second substrate;
   pixel electrodes covering the first protrusions;
   second protrusions located on the second substrate, the second protrusions being located on one side of the second substrate facing the first substrate and protruding toward the first substrate; and
   common electrodes covering the second protrusions,
   wherein, as viewed in a plane view parallel with the first substrate or the second substrate, the first protrusions and the second protrusions are of strip shape extending along a first direction, and the first protrusions and the second protrusions are arranged alternately at intervals in a second direction perpendicular to the first direction,
   wherein, each of the pixel units further includes:
   a pixel voltage signal input line located on the first substrate, the pixel voltage signal input line being electrically connected between the pixel electrodes, the pixel voltage signal input line and the first protrusions have no overlap in the plane view; and
   a common voltage signal input line located on the second substrate, the common voltage signal input line being electrically connected between the common electrodes, the common voltage signal input line and the second protrusions have no overlap in the plane view, the pixel voltage signal input line and the common voltage signal input line extend along the second direction, and
   wherein the common electrodes and the pixel electrodes have no overlap in the plane view.

2. The blue phase liquid crystal display device according to claim 1, wherein materials for forming the first protrusions and the second protrusions are both an organic transparent dielectric material.

3. The blue phase liquid crystal display device according to claim 1, wherein a height of the first protrusions and a height of the second protrusions are both less than a thickness of the blue phase liquid crystal layer.

4. The blue phase liquid crystal display device according to claim 3, wherein, the blue phase liquid crystal display device further comprises: a main spacer and an auxiliary spacer which are arranged between the first substrate and the second substrate, a height of the main spacer being equal to the thickness of the blue phase liquid crystal layer, and the height of the main spacer being greater than a height of the auxiliary spacer;
   the height of the first protrusions and the height of the second protrusions are both less than or equal to the height of the auxiliary spacer.

5. The blue phase liquid crystal display device according to claim 3, wherein, a ratio of the height of the first protrusions to the thickness of the blue phase liquid crystal layer ranges within 1:2-4:5, and a ratio of the height of the second protrusions to the thickness of the blue phase liquid crystal layer ranges within 1:2-4:5.

6. The blue phase liquid crystal display device according to claim 1, wherein, in each of the pixel units, intervals between the first protrusions and the second protrusions adjacent to the first protrusions along a plane direction of the first substrate or second substrate are preset intervals, and respective preset intervals are equal.

7. The blue phase liquid crystal display device according to claim 1, wherein, each of the pixel units includes 2-4 first protrusions and 2-4 second protrusions.

8. The blue phase liquid crystal display device according to claim 1, wherein, the pixel voltage signal input line and the common voltage signal input line are located on opposite sides of the first protrusions or the second protrusions in the first direction.

9. The blue phase liquid crystal display device according to claim 1, wherein, the pixel electrodes are located on top and side surfaces of the first protrusions; and the common electrodes are located on top and side surfaces of the second protrusions.

10. The blue phase liquid crystal display device according to claim 1, further comprising:
    a pixel voltage signal periphery line electrically connected with the pixel voltage signal input line, for transmitting an external pixel voltage signal to the pixel voltage signal input line; and
    a common voltage signal periphery line electrically connected with the common voltage signal input line, for transmitting an external common voltage signal to the common voltage signal input line,
    wherein, the pixel voltage signal periphery line and the common voltage signal periphery line are both located on a frame region of the first substrate; or the pixel voltage signal periphery line is located on the frame region of the first substrate, and the common voltage signal periphery line is located on a frame region of the second substrate; or the pixel voltage signal periphery line and the common voltage signal periphery line are both located on the frame region of the second substrate.

11. A manufacturing method of a blue phase liquid crystal display device, the blue phase liquid crystal display device manufactured comprising a plurality of pixel units arranged in a matrix, the manufacturing method comprising:
    forming first protrusions in a region corresponding to each of the pixel units on a first substrate;
    forming pixel electrodes covering the first protrusions;
    forming second protrusions in a region corresponding to each of the pixel units on a second substrate;
    forming common electrodes covering the second protrusions; and forming a blue phase liquid crystal layer between the first substrate and the second substrate, and a side of the first substrate on which the first protrusions are formed facing a side of the second substrate on which the second protrusions are formed, wherein, as viewed in a plane view parallel with the first substrate or the second substrate, the first protrusions and the second protrusions are of strip shape extending along a first direction, and the first protrusions and the second protrusions are arranged alternately at intervals in a second direction perpendicular to the first direction, wherein, each of the pixel units further includes:

a pixel voltage signal input line located on the first substrate, the pixel voltage signal input line being electrically connected between the pixel electrodes, the pixel voltage signal input line and the first protrusions have no overlap in the plane view; and a common voltage signal input line located on the second substrate, the common voltage signal input line being electrically connected between the common electrodes, the common voltage signal input line and the second protrusions have no overlap in the plane view, wherein the pixel voltage signal input line and the common voltage signal input line extend along the second direction, and wherein the common electrodes and the pixel electrodes have no overlap in the plane view.

12. The method according to claim 11, wherein materials for forming the first protrusions and the second protrusions are both an organic transparent dielectric material.

13. The method according to claim 11, wherein a height of the first protrusions and a height of the second protrusions are both less a thickness of the blue phase liquid crystal layer.

14. The method according to claim 11, wherein, a ratio of the height of the first protrusions to the thickness of the blue phase liquid crystal layer ranges within 1:2-4:5, and a ratio of the height of the second protrusions to the thickness of the blue phase liquid crystal layer ranges within 1:2-4:5.

15. The method according to claim 11, wherein, in each of the pixel units, intervals between the first protrusions and the second protrusions adjacent to the first protrusions along a plane direction of the first substrate or second substrate are preset intervals, and respective preset intervals are equal.

16. The method according to claim 11, wherein, each of the pixel units includes 2-4 first protrusions and 2-4 second protrusions.

* * * * *